Patented Sept. 29, 1936

2,055,699

UNITED STATES PATENT OFFICE 2,055,699

PROCESS OF PURIFYING PYRANTHRONE

James Ogilvie and Maurice H. Fleysher, Buffalo, N. Y., assignors to National Aniline & Chemical Company, Inc., New York, N. Y., a corporation of New York No Drawing. Application August 25, 1934, Serial No. 741,505

13 Claims. (Cl. 260—61)

This invention relates to the purification of pyranthrone. It is particularly directed to a method for eliminating impurities from crude pyranthrone whereby a purified pyranthrone is obtained which, when applied to materials such as textile fibers in the customary manner, yields dyeings of greatly improved evenness and brilliancy as compared with the crude product.

Pyranthrone is normally prepared by internal condensation of 2,2'-dimethyl-1,1'-dianthraquinonyl in the presence of a condensing agent, for example sodium hydroxide. The resultant crude pyranthrone may be purified in accordance with this invention to give a pyranthrone product of greatly improved dyeing properties.

The following description of our purification method is set forth in connection with the use of sulfuric acid as the purifying reagent in order to simplify the description. It will be understood, however, that chlorsulfonic acid may be used instead of sulfuric acid and where the weight of sulfuric acid is designated, the same weight of chlorsulfonic acid may be employed.

The present method of purification is based upon our discovery that under suitable conditions of temperature and acid concentration pyranthrone is insoluble in a sulfuric acid solution while the impurities associated therewith are readily soluble. In accordance with our invention, pyranthrone is subjected to the action of a relatively concentrated sulfuric acid at a low temperature, say about 15° C. to about 35° C. Under these conditions the pyranthrone remains undissolved, or if in solution is precipitated therefrom, but the impurities are dissolved in the sulfuric acid. By forming a solution of crude pyranthrone in concentrated sulfuric acid at an elevated temperature and then cooling the concentrated solution, the pyranthrone is caused to precipitate from solution in a highly purified condition. If the concentration of the sulfuric acid is below about 75% by weight during precipitation, a part of the impurities precipitates out with the pyranthrone, thus reducing the purity of the product. With more dilute sulfuric acid solutions, the purity of the precipitated pyranthrone product is correspondingly lower. The sulfuric acid may be, and preferably is, employed in considerably higher concentrations but if its concentration is maintained above about 90% by weight during precipitation of the pyranthrone, an appreciable quantity of this product is retained in solution. For best results it is preferred to employ a solution having a sulfuric acid concentration between about 87% and about 89%.

It is not necessary that water be employed as the diluent to obtain the desired concentration of acid; any inert diluent, miscible with sulfuric acid and exerting no substantial solvent effect on pyranthrone at low temperature may be employed instead of water. One or more compatible diluents may be employed. Examples of suitable diluents besides water are acetone, alcohols, acetic acid, nitrobenzene, o-nitrotoluene, phenol, and phosphoric acid.

Considerable latitude is permissible in selecting the cooling range to be employed in effecting the purification herein described. Though not essential, it is of course desirable to provide as great a temperature drop as feasible in order to secure precipitation of a maximum quantity of the pyranthrone dissolved. The temperature conditions also exert an important effect on the character of pyranthrone crystals precipitated. For facility of separation from acid solution it is desirable to obtain large, uniform, well-formed crystals. We have found that by dissolving the crude pyranthrone at a temperature above about 70° C. to form an approximately saturated solution and cooling the resultant solution to a temperature below 35° C., the purification may be carried out in a very effective manner. Preferably an initial temperature between 75° and 97° C. is employed, the solution being cooled slowly down to around 25° C. Under these conditions a maximum effectiveness of purification is attainable and large, readily separable crystals of the purified pyranthrone are formed.

In the practical application of this purification process it is expedient to employ the concentrated sulfuric acid in a ratio between about 6 to 12 parts by weight of the acid ($H_2SO_4$) to 1 part by weight of the pyranthrone. Use of a ratio of acid to pyranthrone greater than about 12 to 1 results in an unnecessary consumption of acid and loss of pyranthrone; whereas in the embodiment of our invention involving solution and precipitation of the pyranthrone, if the ratio is less than about 6 to 1, the pyranthrone product is obtained in the form of a microcrystalline magma from which it is exceedingly difficult to segregate the purified dye crystals.

The following examples will serve to illustrate the nature of this invention which, however, is not intended to be limited thereto.

*Example 1.*—50 parts by weight of crude, finely ground pyranthrone are stirred into 500 parts of sulfuric acid monohydrate (100% $H_2SO_4$) until the pyranthrone is dissolved. 60 parts by weight of water are added slowly to the solution, which preferably is stirred continuously during this addition. The temperature of the resultant solution is brought to about 97° C. during or after addition of water; the solution is then allowed to cool to about 25° C. while being stirred slowly, either continuously or intermittently, during the cooling. During this cooling crystals of purified pyranthrone form in the solution. After cooling of the solution to 25° C., which may require about 8 to 10 hours, the pyranthrone crystals are filtered from the sulfuric acid solution and washed with several small portions of cold sulfuric acid of at least 75% concentration. When the mother liquor in the crystals has been displaced in this manner, the crystals are washed with water until free from acid.

Example 2.—81 parts by weight of commercial alcohol (85% $C_2H_5OH$) are added to 572 parts of sulfuric acid monohydrate (100% $H_2SO_4$) while the solution is being stirred rapidly and the temperature of the solution is brought to about 85° C. The resulting solution has an $H_2SO_4$ concentration of about 88%. 93 parts of finely ground crude pyranthrone are then added. The mixture is stirred vigorously at 90° to 95° C. to dissolve the crude pyranthrone. After the pyranthrone is dissolved, the solution is allowed to cool to about 25° C. During cooling it is stirred slowly, either continuously or intermittently. The resultant slurry of purified pyranthrone crystals is separated from the solution by filtration or by means of a centrifuge. The pyranthrone crystals thus obtained are washed with several portions of sulfuric acid of about 75% concentration. When the mother liquor in the crystals has been displaced, they are washed with water until free of acid.

Example 3.—40 parts of crude, finely ground pyranthrone are added to a mixture of 400 parts of 99% sulfuric acid and 50 parts of water at 25° C. and the resulting mixture agitated for about 20 hours. The insoluble product is then filtered off, washed with 100 parts of 88% sulfuric acid and then with water. The product consists of purified pyranthrone.

It will be evident from the above examples that the concentration of sulfuric acid may be adjusted to the preferrred concentration by means of a suitable diluent either prior to, during, or after addition or solution of crude pyranthrone. Other changes also may be made in the conditions of carrying out the process without departing from the scope of the present invention.

We claim:

1. The method of purifying crude pyranthrone, which comprises subjecting crude pyranthrone to the action of a concentrated acid of the group consisting of sulfuric acid and chlorsulfonic acid to form a solution of impurities in the concentrated acid, and separating pyranthrone in a purified condition from the solution of impurities in the acid while the acid is in a concentrated condition.

2. The method of purifying crude pyranthrone which comprises subjecting crude pyranthrone to the action of sulfuric acid having a concentration of at least 75% $H_2SO_4$ to form a solution of impurities in the concentrated acid, and separating pyranthrone in a purified condition from the solution of impurities while the sulfuric acid concentration is at least 75% $H_2SO_4$.

3. The method of purifying crude pyranthrone, which comprises dissolving crude pyranthrone in a hot concentrated acid of the group consisting of sulfuric acid and chlorsulfonic acid to form a solution containing pyranthrone and impurities, cooling the concentrated acid solution to effect crystallization of pyranthrone therefrom, and separating the pyranthrone crystals from the concentrated acid solution containing impurities.

4. The method of purifying crude pyranthrone, which comprises dissolving crude pyranthrone at a temperature above 70° C. in a concentrated acid of the group consisting of sulfuric acid and chlorsulfonic acid to form a solution containing pyranthrone and impurities, cooling the concentrated acid solution to a temperature below about 35° C. to effect crystallization of pyranthrone therefrom, and separating the pyranthrone crystals from the concentrated acid solution of impurities.

5. The method of purifying crude pyranthrone, which comprises dissolving crude pyranthrone in sulfuric acid having a concentration of at least 75% $H_2SO_4$ to form a solution containing pyranthrone and impurities, cooling the solution to cause crystallization of pyranthrone therefrom while the sulfuric acid concentration is at least 75% $H_2SO_4$, and separating the pyranthrone crystals from the resulting concentrated acid solution of impurities.

6. The method of purifying crude pyranthrone, which comprises forming a solution of the crude pyranthrone in sulfuric acid having a concentration between about 75% and about 90% at a temperature above about 70° C., cooling the solution while the sulfuric acid concentration is between about 75% and about 90% to crystallize pyranthrone, and separating the pyranthrone crystals from the sulfuric acid solution.

7. The method of purifying crude pyranthrone, which comprises forming a solution of the crude pyranthrone in concentrated sulfuric acid at a temperature between 75° C. and 97° C., cooling the concentrated sulfuric acid solution to cause crystallization of pyranthrone therefrom while the sulfuric acid is in concentrated condition, and separating the pyranthrone crystals from the concentrated sulfuric acid.

8. The method of purifying crude pyranthrone, which comprises forming a solution of the crude pyranthrone in sulfuric acid having an $H_2SO_4$ concentration between about 75% and about 90% at a temperature between 75° C. and 97° C., $H_2SO_4$ and pyranthrone being present in a ratio between about 6:1 and about 12:1, cooling the solution while the $H_2SO_4$ concentration is between about 75% and about 90% to a temperature of about 25° C. to effect crystallization of the pyranthrone, and separating the pyranthrone crystals from the concentrated sulfuric acid solution.

9. The method of purifying crude pyranthrone, which comprises forming a solution of the crude pyranthrone in water-sulfuric acid solution having an $H_2SO_4$ concentration between about 87% and about 89% at a temperature between 75° C. and 97° C., $H_2SO_4$ and pyranthrone being present in a ratio between about 6:1 and about 12:1, slowly cooling the solution while the $H_2SO_4$ concentration is between about 87% and about 89% to a temperature of about 25° C. to effect crystallization of the pyranthrone, and separating the pyranthrone crystals from the concentrated sulfuric acid solution.

10. The method of purifying crude pyranthrone, which comprises forming a solution of the crude pyranthrone in ethanol-sulfuric acid solution having an $H_2SO_4$ concentration between about 87% and about 89% at a temperature between 75° C. and 97° C., H₂SO₄ and pyranthrone being present in a ratio between about 6:1 and about 12:1, cooling the solution while the H₂SO₄ concentration is between about 87% and about 89% to a temperature of about 25° C. to effect crystallization of the pyranthrone, and separating the pyranthrone crystals from the concentrated sulfuric acid solution.

11. The method of purifying crude pyranthrone, which comprises agitating the pyranthrone in finely ground form with cold aqueous sulfuric acid having an H₂SO₄ concentration between about 87% and about 89%, and thereafter separating the pyranthrone from the solution while the H₂SO₄ concentration is between about 87% and about 89%.

12. In a method of purifying pyranthrone associated with impurities, the step which comprises separating purified pyranthrone from a solution of the impurities in an acid of the group consisting of sulfuric acid and chlorsulfonic acid while the acid is in a concentrated condition.

13. In a method of purifying pyranthrone associated with impurities, the step which comprises separating purified pyranthrone from a solution of the impurities in sulfuric acid having a concentration within the range from about 75 per cent to about 90 per cent while the sulfuric acid concentration is within the aforesaid range.

JAMES OGILVIE.
MAURICE H. FLEYSHER.